May 27, 1924.  1,495,314
E. C. WALKER
METHOD OF DETERMINING THE AMOUNT OF SOLUBLES IN LIQUIDS
Filed Nov. 8, 1920
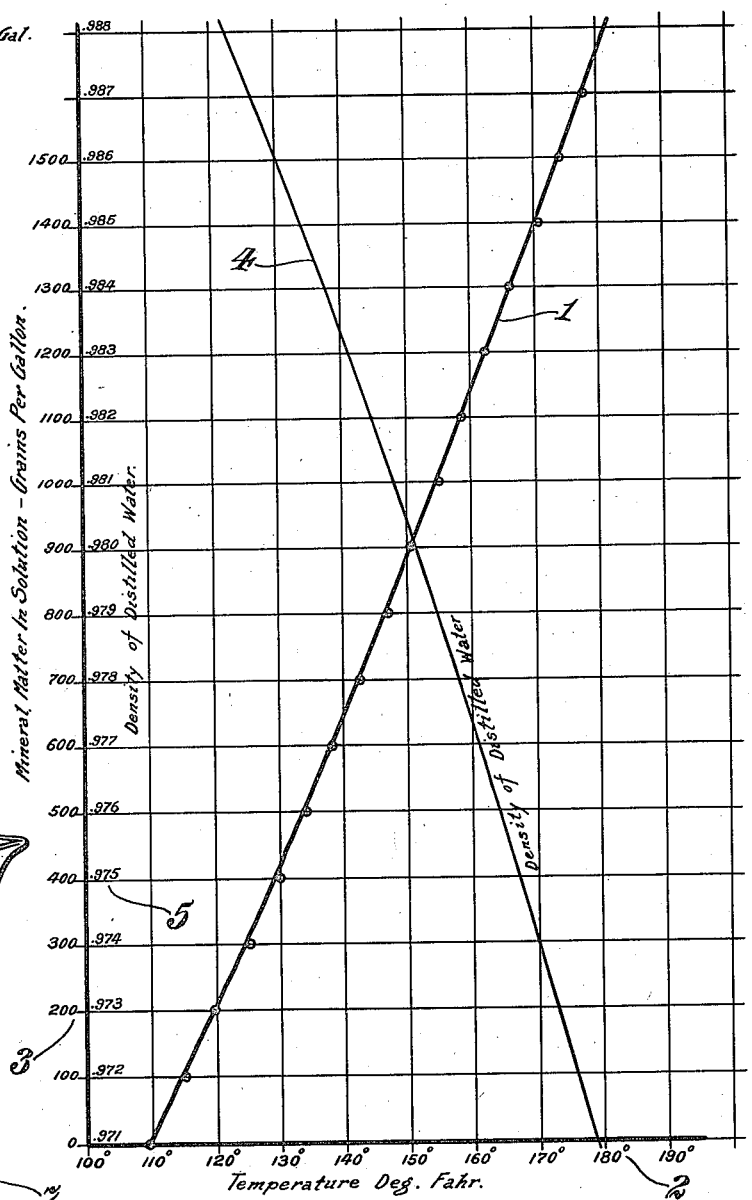
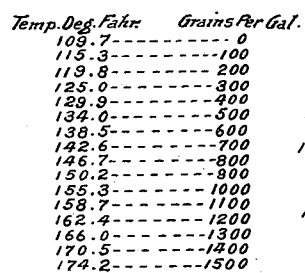
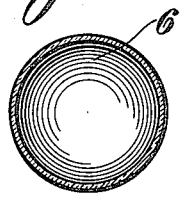
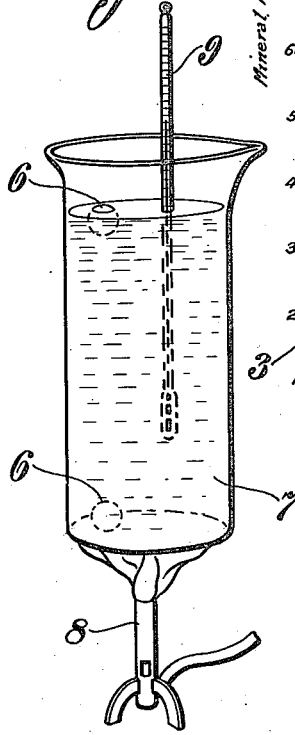
Inventor:
EDWARD C. WALKER,
By John H. Bruninga
His Attorney Patented May 27, 1924.

1,495,314

UNITED STATES PATENT OFFICE.

EDWARD C. WALKER, OF KINLOCH, MISSOURI.

METHOD OF DETERMINING THE AMOUNT OF SOLUBLES IN LIQUIDS.

Application filed November 8, 1920. Serial No. 422,683.

*To all whom it may concern:*

Be it known that I, EDWARD C. WALKER, a citizen of the United States, and residing at Kinloch, county of St. Louis, Missouri, have invented the new and useful Improvement in Methods of Determining the Amount of Solubles in Liquids, of which the following is a specification.

This invention relates to a method and apparatus for determining the amount of solubles carried in solution in a liquid.

It is a well known fact that the density or specific gravity of a solution of any given substance in a solvent depends not only upon the amount or percentage of said substance dissolved in a given quantity of solvent, but also upon the temperature of the solution. Ordinary methods of determining the temperature and specific gravity of a solution are cumbersome and laborious and not adapted to an easy and quick determination of the amount of solubles in a liquid, particularly when such determination must be made by one uneducated in the scientific principles involved.

One of the objects of this invention, therefore, is to provide a method or apparatus for determining the amount of solubles in a liquid which shall involve few and simple operations or manipulations.

Another object of this invention is to provide a method and apparatus for such a determination which shall involve little or no mathematical calculation.

Another object of this invention is to provide a method and apparatus for such a determination which may be carried out by one uneducated in the scientific principles involved.

Further objects will appear from the following description taken in connection with the accompanying drawing, in which:

Figure 1 shows a chart on which are plotted in graphical form, to suitable coordinates, curves representing the mathematical relations between the quantities involved;

Figure 2 shows in tabular form, the relation shown by one of the curves of Figure 1;

Figure 3 is a sectional view of the glass float used in determining specific gravity; and Figure 4 shows the apparatus, and illustrates the method of use.

Referring now to the accompanying drawing, in Figure 1, the curve 1 represents the relation between the amount of soluble contained in a given quantity of a certain liquid and the temperature of that liquid under the condition that the specific gravity of said liquid shall remain constant throughout the extent of said curve. On this chart the horizontal scale 2 represents the temperature in degrees and the vertical scale 3 represents the soluble matter in the solution measured in grains per gallon. The curve 4 shows the relation between the density of distilled water and the temperature of said water, being plotted to the same horizontal scale of temperature 2 and to the vertical scale 5 of density. The use of these curves will be pointed out hereinafter.

In Figure 3, 6 represents a float which may be made of glass, blown hollow, or of other suitable material whose weight and displacement have been so adjusted that it will just float in a liquid having a certain definite specific gravity. In other words, the float 6 will float on the surface of any liquid having a specific gravity equal to or greater than a certain definite value and will sink to the bottom in any liquid having a less specific gravity. It is, of course, understood that it is not necessary to actually adjust the buoyancy of the float 6 to a given value, but such value may be determined experimentally.

The method of use is as follows: The liquid in which the solubles are to be determined may be placed in a container 7 to which heat may be applied by means of any suitable heater 8 so as to gradually raise the temperature of the liquid. The float 6 is immersed in the liquid and will float on the surface of the liquid when the liquid is cold. As the temperature rises, the density of the liquid will decrease. A thermometer or other suitable temperature measuring device 9 is immersed in the liquid and the apparatus is adjusted so that the gradual rise of temperature may be followed by the indication of the thermometer 9. As the temperature rises and the density falls, a point will be reached where the density corresponds to the buoyancy of the float 6 and said float will sink to the bottom of the container. At this point, the temperature reading is taken. Simultaneous readings are thus provided, of temperature and specific gravity of the liquid. As the curve 1 of Figure 1 is based upon the specific gravity corresponding to the buoyancy of the float 6, the temperature reading so taken when applied to the curve 1 will give the quantity of solubles in solution in the liquid. For instance, if such temperature reading happens to be one hundred and seventy degrees, this reading is applied to the chart by following the vertical line corresponding to one hundred and seventy degrees to the point where it intersects the curve 1 and then following to the left along the horizontal line which passes through said point of intersection to the scale 3 and the value of fourteen hundred grains per gallon is found.

The process may be reversed by drawing off into the container 7, hot liquid from a boiler or similar source, immersing in it the float 6 and the thermometer 9 and allowing it to cool. When the temperature drops to the point where the specific gravity corresponds to the buoyancy of the float 6 and passes said point, the float will immediately rise to the top and the temperature reading is taken at that point and applied to the chart of Figure 1 as described above.

It will be seen that this invention provides a quick and simple method for determining the amount of solubles in a liquid, that that method can be applied without the use of mathematical calculations, and that it may be carried out by one uneducated in the scientific principles involved.

It is, of course, understood that this invention is not limited to the specific details shown and described, as a considerable number of variations are possible within the scope of this invention. The chart of Figure 1 may be drawn in a great many different ways well known to those skilled in the art. The information contained in the chart 1, may be arranged in tabular form as illustrated in Figure 2 which is also subject to variations. In some instances it may be convenient to put this information in the form of a slide rule in a manner well known to those skilled in the art. All of these and similar variations are within the scope of this invention as set forth in the claims.

Having thus described this invention, what is claimed is:

1. The method of determining solutes in liquids, comprising, measurement of the temperature at a given specific gravity in order to estimate the solute.

2. The method of determining solutes in liquids, comprising, gradually changing the temperature of the liquid so as to change the specific gravity thereof, and measuring the temperature at a given specific gravity in order to estimate the solute.

3. The method of determining solutes in liquids, comprising, immersing in the liquid a float of predetermined buoyancy, gradually changing the temperature of the liquid, and measuring the temperature at which said float changes level in order to estimate the solute.

4. The method of determining solutes in liquids, comprising, measurement of the temperature at a given specific gravity, and converting the temperature to percentage of the solute in the liquid.

5. The method of determining solutes in liquids, comprising, immersing in the liquid a float of predetermined buoyancy, measuring the temperature at which said float rises in the liquid in order to estimate the solute.

6. The method of determining solutes in liquids, comprising, immersing in the liquid a float of predetermined buoyancy, measuring the temperature at which said float sinks in the liquid in order to estimate the solute.

In testimony whereof I affix my signature this 13th day of Sept., 1920.

EDWARD C. WALKER.